United States Patent [19]
Lee

[11] Patent Number: 5,675,193
[45] Date of Patent: Oct. 7, 1997

[54] MANUAL OVERRIDE MECHANISM FOR AUTOMATIC SWITCHING CIRCUIT

[75] Inventor: Wade Lee, Lafayette, Calif.

[73] Assignee: Larry C. Y. Lee, Hayward, Calif.

[21] Appl. No.: 346,420

[22] Filed: Nov. 29, 1994

[51] Int. Cl.$^6$ .................................................. H01H 35/00
[52] U.S. Cl. .......................... 307/116; 307/125; 307/139; 307/157; 315/159; 315/361
[58] Field of Search ...................................... 307/112, 116, 307/117, 125, 141, 157, 139, 140; 340/500; 315/159, 361; 250/221

[56] References Cited

U.S. PATENT DOCUMENTS

| | | | |
|---|---|---|---|
| 4,873,469 | 10/1989 | Young et al. | 315/155 |
| 4,943,712 | 7/1990 | Wilder | 250/221 |
| 5,127,575 | 7/1992 | Beerbaum | 236/46 R |
| 5,192,884 | 3/1993 | Kusano | 327/552 |
| 5,194,858 | 3/1993 | Erwin | 340/825.7 |
| 5,442,177 | 8/1995 | Boulos et al. | 250/342 |
| 5,489,827 | 2/1996 | Xia | 315/294 |

Primary Examiner—William M. Shoop, Jr.
Assistant Examiner—Jonathan S. Kaplan
Attorney, Agent, or Firm—Elliot B. Aronson

[57] ABSTRACT

A manual override circuit for use in commercial and household electronic devices. The override circuit may employ as little as a single integrated-circuit operational amplifier, two capacitors, which are charged and discharged in appropriate sequence in response to toggling of the power supply, and several resistors. In one embodiment the manual override circuitry includes an integrated-circuit operational amplifier, which provides a high signal at its output for triggering switching circuitry to energize a load. An RC network couples low-voltage a power supply to the inverting input of the op amp. The inverting and noninverting inputs of the op amp are coupled together through a resistive network, which may be provided by single resistor. A second resistive network, which may also be provided by single resistor couples the inverting input to ground. A resistive feedback path, which may also be provided by single resistor couples the op amp output to the noninverting input, which is also coupled to ground through an additional capacitor. This simple circuit arrangement, which may consist of as little as one op amp, two capacitors, and five resistors, provides fully stable manual override operation in response to manual toggling of a switch controlling power to the device.

2 Claims, 1 Drawing Sheet

MANUAL OVERRIDE MECHANISM FOR AUTOMATIC SWITCHING CIRCUIT

BACKGROUND OF THE INVENTION

The present invention relates generally to controlled or automatic switching circuits such as commonly used in commercial and household electronic devices and is more particularly directed to techniques for manually overriding the action of such switching circuits.

The problem addressed by the present invention may be illustrated in the example of a passive infrared (PIR) motion detector, although the same problem arises in a variety of applications. A PIR motion detector is a device used in automatic light switches to turn on a light when a person or motor vehicle enters a monitored area. Such devices are used with outdoor residential lighting, for example, to illuminate a walkway as a person approaches the front door or to illuminate a driveway as a car approaches.

The PIR motion detector functions by sensing heat in the form of infrared radiation emanating from a person or similarly warm object as the person or object enters or moves about in the field of view of the detector. When the motion detector detects an appropriate heat impulse characteristic of a moving heat source, it provides a low-voltage electrical signal to activate the light or other alarm. An electronic switching circuit, typically controlled by a triac or other thyristor, receives the low-voltage electrical signal and in response switches on electrical power to energize the light. The switching circuit typically is configured to keep the light on for a pre-set duration after motion has been detected. Thus, for example, when a person enters the motion detector's field of view, a light automatically comes on and remains on typically for five to fifteen minutes. The light is then automatically extinguished at the end of the pre-set period unless further motion is detected.

It is sometimes desired to override the automatic switching action of the motion detector manually, for example, from a wall switch. The user may hear a noise from outside the house and may want to turn on an exterior light from a wall switch to investigate. Noises may occasionally be caused by a source that goes undetected by the motion detector, either because the source is too small, too far away, or outside the field of view of the motion detector. In other circumstances the user may want to leave the light illuminated for longer than the pre-set period for automatic extinguishment. To activate the typical manual override mechanism the user toggles the wall switch by turning the switch off momentarily and then almost immediately turning it back to its "on" position. To respond to the toggling of the wall switch, manual override circuitry of the prior art has generally employed integrated-circuit components of the sort used in digital logic applications. The use of such integrated-circuit chips as flip-flops, latches, or counters for the manual override circuit in low-cost commercial or household devices represents a tradeoff. The specialized integrated-circuit chips are more costly and require yet additional circuit components to form a functional override mechanism. That is to say, in the override mechanisms of the prior art the total number of electrical components making up the circuit is not small, some of the components are costly, and assembly of the circuit requires more steps. The net result is that the cost of prior art manual override circuitry is higher than desired.

SUMMARY OF THE INVENTION

The present invention provides a manual override circuit for use in commercial and household devices that uses very few electronic components, is extremely economical to manufacture, and yet provides highly stable and reliable performance. An override circuit according to the invention requires only a single integrated-circuit operational amplifier, two capacitors, which are charged and discharged in appropriate sequence in response to toggling of the power supply, and several resistors. Such a simple circuit of such simple components has a number of advantages particularly for use in low-cost commercial or household devices. The need for only a single op amp is beneficial because integrated-circuit op amps, which are extremely common circuit components, are typically sold in so-called quad packages with four op amps encased in a single chip package. Thus, use of only a single op amp frees up three op amps for other uses in the main circuitry of the device. Because the override circuitry need use only one op amp and only few additional components, it is substantially cheaper to manufacture. An unexpected benefit of the present circuit arrangement is that notwithstanding the relatively few components, the circuit gives superior control over the toggling window, that is, the amount of time for the user to toggle the switch manually from its "on" position to its "off" position and back to its "on" position again. While many simple circuit designs lacking additional stabilizing components tend to go into oscillation, a circuit arrangement according to the present invention is stable against self-induced oscillation or oscillation caused by transients. Notwithstanding the absence of flip-flops, latches or other digital logic circuit components for preserving stable logic signals, the present invention nevertheless provides reliable bistable operation providing separate stable states indicating manual override active and manual override inactive.

A further understanding and appreciation of the structure, operation and advantages of the invention will be gained by reference to the remaining portions of the specification and to the attached drawings.

DETAILED DESCRIPTION OF ILLUSTRATIVE EMBODIMENTS

Figure 1:
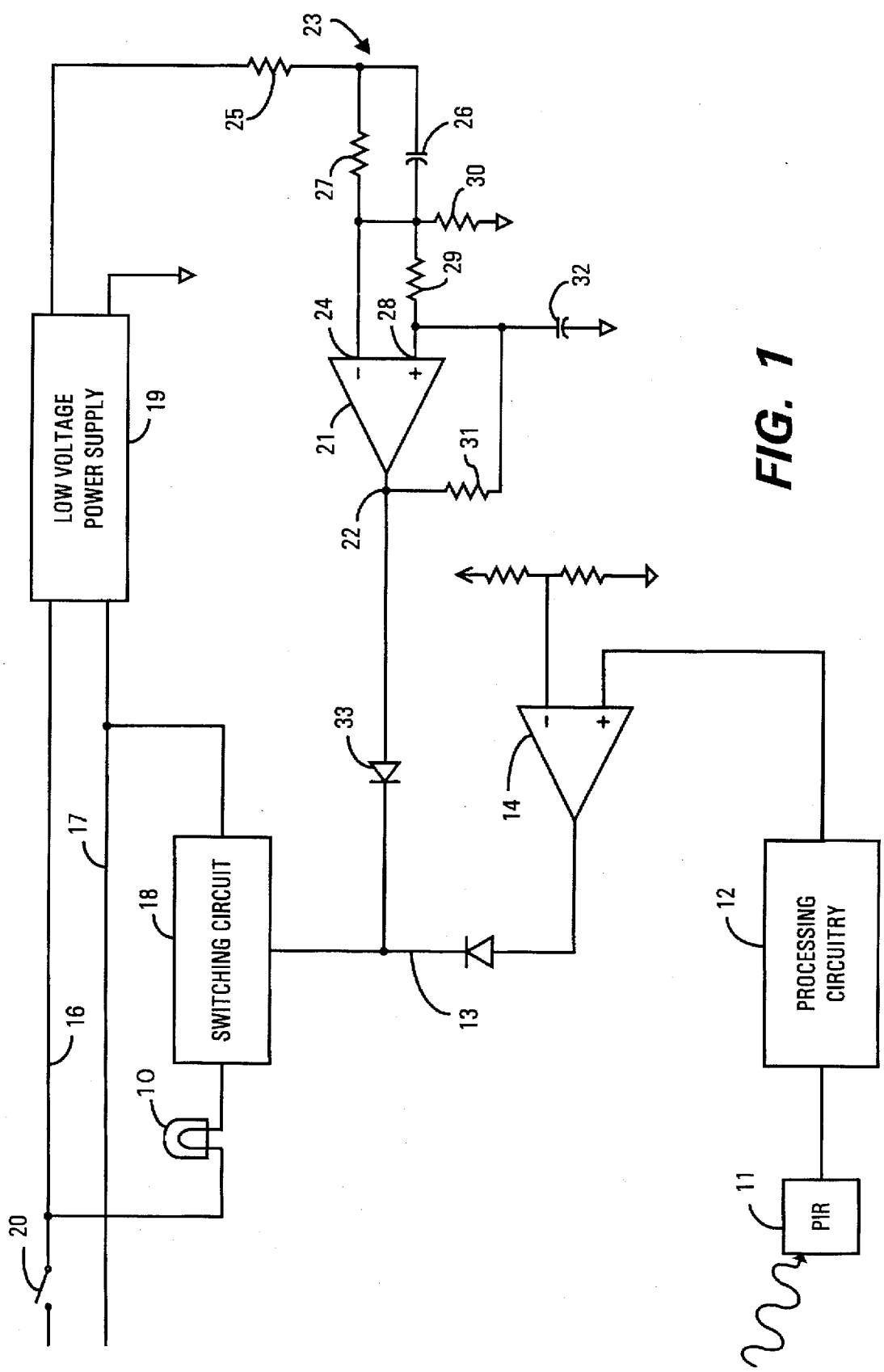
FIG. 1 is an electrical circuit schematic diagram showing a manual override circuit according to the invention.

A manual override circuit according to the invention is illustrated here in an embodiment of a passive infra-red motion detector. The invention may also be embodied in other commercial or household devices for manually overriding automatic switching circuits. The invention is thus not to be limited to the specific embodiment disclosed here, which is offered only by way of example.

In FIG. 1 a light 10 is illuminated in response to infra-red radiation received at passive infra-red sensor 11. When the infra-red radiation hits sensor 11, the sensor provides an electrical signal to processing circuitry 12. The processing circuitry determines whether the received infra-red radiation has the characteristics expected to be produced by a target object and if so, provides a trigger signal along control line 13 for energizing light 10. The trigger signal itself is generated at an output stage, which in FIG. 1 is provided by operational amplifier 14. As configured in FIG. 1, amplifier 14 provides a high signal at its output when processing circuitry 12 has determined that a target object has been spotted. The motion detector apparatus receives conventional household A.C. line voltage along lines 16 and 17 from the electrical mains. Light 10 is connected across power lines 16 and 17 through controlled switching circuitry 18, which connects power across the light in response to a trigger signal from amplifier 14 on control line 13. While light 10 typically operates at the full voltage of the power mains, the remainder of the circuit operates at a lower voltage, typically five to fifteen volts, which is provided by power supply circuitry 19. The motion detector device is powered up through switch 20, which will typically be a wall switch. In the normal operation of the device switch 20 is left in its closed position.

The manual override circuitry includes an integrated-circuit operational amplifier 21, which provides a high signal at its output 22 for triggering switching circuitry 18 to energize light 10. An RC network, indicated generally at 23, couples low-voltage power supply 19 to the inverting input 24 of op amp 21. RC network 23 includes resistor 25 and capacitor 26 in series and resistor 27 in parallel with capacitor 26. The inverting and noninverting inputs 24 and 28 of op amp 21 are coupled together through a resistive network provided in FIG. 1 by single resistor 29. A second resistive network provided here by single resistor 30 couples inverting input 24 to ground. A resistive feedback path provided here by single resistor 31 couples output 22 of op amp 21 to noninverting input 28, which is also coupled to ground through capacitor 32. This simple circuit arrangement, which in the embodiment of FIG. 1 consists of one op amp, two capacitors, and five resistors, provides the fully stable manual override function provided in the prior art only by more complicated or more expensive circuits.

In operation, the circuit functions as follows. When power is first applied to the motion detector device, e.g., when the user first closes wall switch 20 after installing the device, a current flows through resistor 25 charging capacitor 26. Almost immediately, inverting input 24 rises in voltage, and this causes the signal at output 22 to go low. When output 22 goes low, current is pulled through the resistive feedback path (resistor 31), which holds noninverting input 28 low. Inverting input 24 is higher in voltage than noninverting input 28 and is stably maintained in this configuration by the voltage dividing action of the resistor configuration. At this stage capacitor 32 also helps to assure a low value at noninverting input 28, because any current leaking through capacitor 26 goes to capacitor 32. This defines the first steady state of the override circuit. In this state inverting input 24 is at ground potential and is higher than the noninverting input 28. In this configuration the output of op amp 21 is low. The low output is fed back, and capacitor 26 charges completely. The circuit will stay in this state as long as the power supply is not interrupted.

Assume now the user desires to turn on the lights manually. The user toggles wall switch 20, which consists of opening the switch momentarily and then closing it again. When the user opens switch 20, which interrupts power to the override circuit, the voltage from power supply 19 starts to drop. When this happens, capacitor 26 starts to discharge back into power supply 19. In doing so, inverting input 24 becomes negative with respect to noninverting input 28. Resistor 25 has a lower value than resistor 30 to assure that capacitor 26 preferentially discharges through resistor 25. Inverting input 24 is pulled below input 28 as capacitor 26 is discharging. Before power supply 19 has an opportunity to die (which may take several seconds), op amp 21 toggles (that is, switches to a high signal at its output). The high output signal feeds back through resistor 31 and charges capacitor 32, which charges completely very rapidly, that is, before power supply 19 goes completely dead. The charge on capacitor 32 temporarily maintains noninverting input 28 at its higher voltage and maintains the output of op amp 21 in a high state. This prolongs the time that the user has to toggle the wall switch back to the closed position and serves to define an effective "toggling window" for returning the wall switch to the closed ("on") position.

Once the user flips wall switch 20 back to its closed position, power is restored to the override circuit. The voltage to the circuit rises very quickly. At this stage noninverting input 28 is at a higher voltage than inverting input 24, which has dipped below ground. The signal level at output 22 is high, and is maintained in this configuration through feedback resistor 31. The high signal at output 22 is applied to control line 13 through blocking diode 33, which causes switching circuit 18 to turn on light 10 regardless of the state of the output from op amp 14.

To resume normal motion detector operation after the override circuit has been switched to its high (active) state, the user toggles wall switch 20 again. When the user first begins to open the switch, capacitor 32 is fully charged and will feed power into capacitor 26 as it discharges. The result is that the potential at noninverting input 28 drops faster than that at inverting input 24 and the op amp toggles back to the low state. Sufficient voltage differential is maintained between the steady states so that op amp 21 is stable.

The selection of the resistor values depends on the particular power supply and circuit impedance. The capacitor values are selected to define the desired duration of the toggling window. The selection of appropriate capacitor and resistor values for any desired application is entirely routine and within the ordinary skill in the art. It should be noted that capacitor 26 is never in reverse polarization, which would tend to destroy it. In effect, the operation of the present circuit relies on "reverse polarization" of capacitor 26 without actually reverse polarizing the capacitor. Instead, the circuit pulls the negative side below ground without damaging the capacitor. This is in contrast with normally accepted practice, in which protective diodes would be inserted to prevent capacitor 26 from reverse polarizing. Such diodes are not necessary here. Reverse polarization does not occur because resistor values are selected so that in either steady state the positive input to the capacitor is always greater than the negative input.

The above descriptions and drawing disclose an illustrative embodiment of the invention. Given the benefit of this disclosure, those skilled in the art will appreciate that various modifications, alternate constructions, and equivalents may also be employed to achieve the advantages of the invention. For example, those skilled in the art will recognize that the manual override circuitry may readily be arranged in a mirror configuration in which the output is high on initial powerup and subsequently toggles to low. This may be achieved, for example, through reversing the connections to the inverting and noninverting op amp inputs. Therefore, the invention is not to be limited to the above description and illustrations, but is defined by the appended claims.

What is claimed is:

1. Manual override circuitry for use in a device including automatic switching circuitry for energizing a load in response to a control signal along a control line, the device being powered at least in part by a voltage supply interruptable by a manually operable switch, said manual override circuitry comprising:

an operational amplifier having inverting and noninverting inputs and an output, said output being connected to said control line for applying a manual override signal thereto for control of said switching circuitry;

a first RC network coupling said voltage supply to one of said inverting and noninverting inputs to be charged and discharged in response to opening and closing of said manually operable switch;

a first resistive network coupling said inverting and noninverting inputs;

a second resistive network coupling said one input to ground;

a resistive feedback path coupling said amplifier output with the other of said inverting and noninverting inputs; and a first capacitor coupling said other input to ground;

whereby toggling said manually operable switch charges and discharges said first RC network and said first capacitor so as to toggle the output state of said operational amplifier and thereby toggling said manual override signal.

2. The apparatus of claim 1 wherein said first RC network comprises a second capacitor, a first resistor in series with said second capacitor, and a second resistor in parallel with said second capacitor, said first resistor being connected to said voltage supply;

said first resistive network consists of a third resistor;

said second resistive network consists of a fourth resistor; and said resistive feedback path consists of a fifth resistor.

* * * * *